United States Patent [19]

Hamanaka et al.

[11] Patent Number: 5,002,991
[45] Date of Patent: Mar. 26, 1991

[54] PERMANENT ANTISTATIC RESIN COMPOSITION

[75] Inventors: Hiroyoshi Hamanaka, Yachiyo; Tetsuji Kakizaki, Yokkaichi, both of Japan

[73] Assignee: Mitsubishi Petrochemical Company Limited, Tokyo, Japan

[21] Appl. No.: 333,260

[22] Filed: Apr. 5, 1989

[30] Foreign Application Priority Data

Apr. 7, 1988 [JP] Japan .................................. 63-85779
Apr. 7, 1988 [JP] Japan .................................. 63-85780

[51] Int. Cl.$^5$ ................................................ C08L 5/55
[52] U.S. Cl. ..................................... 524/183; 525/186; 525/179; 525/167; 525/166; 524/912; 528/8
[58] Field of Search .............. 525/186, 179, 167, 166; 524/183, 912; 528/8

[56] References Cited

FOREIGN PATENT DOCUMENTS 0024043 11/1967 Japan ................................... 524/183
0108450 6/1985 Japan ................................... 524/183

*Primary Examiner*—Paul R. Michl
*Assistant Examiner*—Umakant K. Rajguru
*Attorney, Agent, or Firm*—Wegner, Cantor, Mueller & Player

[57] ABSTRACT

An antistatic resin composition comprising the components (1) and (2) shown below:

component (1): an ethylene random copolymer having a melt flow rate of 0.1 to 50 g/10 min. obtained by copolymerizing 99 to 70% by weight of ethylene and 1 to 30% by weight of a comonomer represented by the formula I:

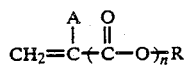

wherein n is 0 or 1, and when n=0, R represents an alkyl group having 2 to 8 carbon atoms and A represents hydrogen, and when n=1, R represents an alkyl group having 1 to 20 carbon atoms and A represents hydrogen or a methyl group;

component (2): a polymeric charge-transfer type complex which is the reaction product of one or more of semi-polar organic boron polymeric compounds represented by the formula II shown below with one or more of tertiary amines with total carbon atoms of 5 to 82 having at least one hydroxyl group, produced through reaction at a ratio of one boron atom to one basic nitrogen atom:

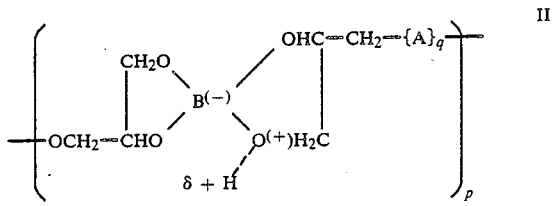

wherein q is 0 or 1, and when l=1, A represents -(X)a-(Y)b-(Z)c- group [X and Z each represent an oxygen-containing hydrocarbon residue with a total of 100 carbon atoms or less having one terminal ether residue, and Y represents

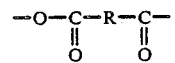

group (R is a hydrocarbon group having 1 to 82 carbon atoms) or

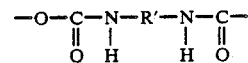

group
(R' is a hydrocarbon group having 2 to 13 carbon atoms), a, b and c are each 0 or 1]; and p is 10 to 1000.

11 Claims, No Drawings

PERMANENT ANTISTATIC RESIN COMPOSITION

BACKGROUND OF THE INVENTION

Field of the Art

This invention relates to a resin composition to cope with electrostatic troubles incurred in the wrapping and packaging of semiconductors, electronic circuit substrates, electronic parts, electronics instruments, medical instruments and precision instruments, and also the anti-dust packaging of pharmaceuticals, cosmetics, foods and the packaging of dangerous materials, etc.

Background Art

Plastics have been used in a wide variety of fields because of their excellent properties such as transparency, durability and light weight, but since they are electrically insulating materials, various troubles due to static charges occur depending on the use or the method of use. Above all, in the field of electronics, destruction and damage to IC and LSI have become problems, and how to cope with static charges is an important and imminent topics.

For that purpose, it is necessary to improve the electrical characteristics of surrounding insulating materials that readily generate charges, and heretofore plastics kneaded with metal fibers or metal plated fibers, films and sheets blended with carbon black, graphite, tin oxide, zinc oxide, indium oxide, etc. have been made. However, these inorganic electroconductive agents cannot convert an insulating material to a material which will not be charged unless they are present to the extent that they are in mutual contact with each other in the matrix resin. However, this involves drawbacks of increasing production cost and also of the physical properties possessed by the substrate material being remarkably changed. Also, no transparent antistatic molded product can be made using these inorganic materials.

Alternatively an internally kneaded type antistatic agent applying a surfactant has also been widely used. This type of antistatic agent is superior to the above mentioned inorganic materials in that the amount of it to be added to a substrate material can be small, and its use does not change the physical properties of the substrate material so much and also can provide a transparent molded product with ease at low cost.

However, this antistatic agent involves some serious problems.

Thus, the effect of the antistatic agent is first exhibited when its molecules migrate to the surface of the substrate material, but the exposed agent on the surface is unstable and may be disturbed or removed by external conditions and factors such as temperature, humidity or contact, friction and the like. Most of the molecules of the agent present in the internal of the substrate material will migrate to the surface after the lapse of a certain period of time, and be drawn out. Accordingly, this type of antistatic agent is generally very poor in suitability and persistence of antistatic effect. Furthermore, since the antistatic mechanism itself is due to the carrier effect (ion conduction mechanism) brought about by the hydrophilic groups of the antistatic agent molecules existing on the surface of the substrate, if there occurs even a minimum disturbance in the oriented adsorption state of the antistatic agent molecules on the surface, it becomes impossible to achieve 100% decay of the charge.

Accordingly, it cannot be said in the strict sense that the aforementioned antistatic agents are a means to eliminate the influence of surrounding static charges during the transportation and use of IC and LSI-related functional products.

SUMMARY OF THE INVENTION

The present invention is intended to provide a solution to this problem, and it has been accomplished based on the finding that a permanent and stable nonchargeable ethylene copolymer composition can be obtained to remove the chargeability of the ethylene copolymer and can quickly and completely discharge the charges momentarily generated by the application of contact, friction, external voltage, etc., by combining a specific ethylene random copolymer and a polymeric charge-transfer type complex which is prepared by reacting an organic boron polymeric compound having boron atoms incorporated regularly within molecules while maintaining the semi-polar bound structure with a hydroxylamine.

Thus, the present invention comprises an antistatic resin composition comprising the components (1) and (2) shown below:

component (1): an ethylene random copolymer having a melt flow rate of 0.1 to 50 g/10 min. obtained by copolymerizing 99 to 70% by weight of ethylene and 1 to 30% by weight of a comonomer represented by the formula I:

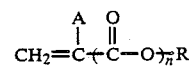

wherein n is 0 or 1, and when n=0, R represents an alkyl group having 2 to 8 carbon atoms and A represents hydrogen, and when n=1, R represents an alkyl group having 1 to 20 carbon atoms and A represents hydrogen or a methyl group;

component (2): a polymeric charge-transfer type complex which is the reaction product of one or more of semi-polar organic boron polymeric compounds represented by the formula II shown below with one or more of tertiary amines with total carbon atoms of 5 to 82 having at least one hydroxyl group, produced through reaction at a ratio of one boron atom to one basic nitrogen atom:

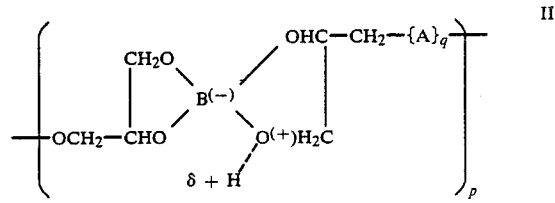

wherein q is 0 or 1, and when q=1, A represents -(X)a-(Y)b-(Z)c- group [X and Z each represent an oxygen-containing hydrocarbon residue with a total of 100 carbon atoms or less having one terminal ether residue, and Y represents

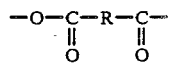

group (R is a hydrocarbon group having 1 to μ carbon atoms) or

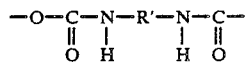

group
(R' is a hydrocarbon group having 2 to 13 carbon atoms), a, b and c are each 0 or 1]; and p is 10 to 1000.

The antistatic resin composition according to the present invention has a persistent antistatic effect which can be called a permanent antistatic resin composition.

More specifically, the specific polymeric charge-transfer type complex of the present invention to be used with the specific ethylene copolymer, despite the fact that it is a polymeric substance of large polarity due to its ionic structure of the coordinate bond type, is well miscible by fusion with the ethylene copolymer which is of small polarity. Moreover, the charge-transfer type complex acts as a foreign matter while taking the form of the Fermi level. Therefore, unlike the above mentioned antistatic agents which neutralize only charges on the surface of a substrate material, the charge-transfer type complex according to the invention not only can make a substrate resin into a permanent non-chargeable material even to the inner portion under conventional conditions, but also can constantly effect 100% leakage of charges which are produced when forced charging is conducted repeatedly under high voltage. Also, the specific polymeric charge-transfer type complex of the present invention is an electroconductive polymer exhibiting mobility of electrons. Accordingly, since electronic conductivity is exhibited for the complex, as different from the antistatic agent whose antistatic function is based on the ion conduction mechanism, the antistatic effect can be sufficiently exhibited even if it is not present on the surface of a substrate material.

Furthermore, the specific polymeric charge-transfer type complex of the present invention has extremely good thermal stability. Therefore, the resin composition containing this complex suffers from no substantial lowering in the physical properties due to the thermal deterioration of the complex during handling at high molding temperature.

DETAILED DESCRIPTION OF THE INVENTION

The antistatic resin composition according to the present invention comprises the component (1) and the component (2).

The term "comprises" herein means that auxiliary materials (described in detail below) other than these two essential components may be contained without departure from the scope of the present invention.

Component (1)

The ethylene copolymer to be used in the present invention is an ethylene random copolymer having a melt flow rate of 0.1 to 50 g/10 min. obtained by copolymerizing 99 to 70% by weight of ethylene and 1 to 30% by weight of a comonomer represented by the formula I:

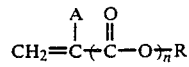

wherein n is 0 or 1, and when n=0, R represents an alkyl group having 2 to 8 carbon atoms and A represents hydrogen, and when n=1, R represents an alkyl group having 1 to 20 carbon atoms and A represents hydrogen or a methyl group.

The above comonomer specifically stands for an α-olefin having 4 to 10 carbon atoms, or an acrylic ester or a methacrylic ester.

The α-olefin having 4 to 10 carbon atoms may include butene-1, pentene-1, hexene-1,4-methylpentene-1, octene-1, decene-1, etc., and there may be used alone or as a mixture thereof. α-Olefins having 4 to 8 carbon atoms are preferably used.

The acrylic or methacrylic ester (herein referred to as "(meth)acrylic ester") preferably has a $C_1$-$C_{20}$ alkyl group. The term "alkyl" herein includes "aralkyl" (and in this case $C_1$-$C_{20}$ carbons include those in the aryl moiety).

Specific examples of such esters may include methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, lauryl methacrylate, tridecyl methacrylate, stearyl methacrylate, cyclohexyl methacrylate, benzyl methacrylate, etc. These may be used alone or as a mixture thereof.

Among the above esters, those having an alkyl group of 4 carbon atoms or less, for example, methyl acrylate, ethyl acrylate, propyl acrylate, n-butyl acrylate and methyl methacrylate, are preferably used. Especially, methyl acrylate and ethyl acrylate are preferred.

Preferred examples of the ethylene random copolymer of component (I) according to the invention may include the following copolymer (A) and copolymer (B).

Copolymer (A): an ethylene random copolymer having a density of 0.910 to 0.940 g/cm³ and a melt flow rate of 0.1 to 50 g/10 min. which comprises 99 to 75% by weight of ethylene and 1 to 25% by weight of an α-olefin having 4 to 10 carbon atoms.

Copolymer (B): an ethylene random copolymer having a melt flow rate of 0.1 to 50 g/10 min. which comprises 98 to 70% by weight of ethylene and 2 to 30% by weight of an acrylic ester and/or a methacrylic ester.

If desired, the copolymers (A) and (B) may further comprise a small amount of a third monomer constituent to the extent that it does not impair the intended effect of the present invention.

A more detail explanation of the copolymers (A) and (B) will be given below.

Copolymer (A)

This copolymer has a density of 0.910 to 0.940 g/cm³, preferably 0.915 to 0.930 g/cm³. The copolymer with a density of less than 0.910 is likely to have a poor heat-sealing strength and also have a poor blocking property when molded into a film. On the other hand, a density beyond 0.940 will lower the antistatic effect of the resin composition according to the present invention. In order to attain the density of the copolymer within the range as specified above, it is generally required that the content of α-olefin constituent in the copolymer be in the range of 1 to 25% by weight, preferably 2 to 10% by weight.

This copolymer generally has a melt flow rate of 0.1 to 50 g/10 min., preferably 1 to 25 g/10 min., more preferably 5 to 20 g/10 min. The copolymer having a melt flow rate below the above mentioned range has a poor flowability and a poor processability. On the other hand, the copolymer of a melt flow rate over the above range will have a deteriorated heat-sealing property and a lowered strength.

This copolymer may be prepared according to any suitable method, for example, by suspension polymerization, solution polymerization, vapor phase polymerization or high-pressure polymerization at 1000 to 3000 atm. and 150° to 300° C., using a transition metal oxide catalyst such as a crome oxide catalyst carried on silica or aluminum, or a coordination catalyst comprising a combination of a halide of a transition metal of the groups IV to VIII of the periodic table such as a titanium halide or a vanadium halide and an organometallic compound of a metal of the groups I to III of the periodic table such as an organoaluminum-magnesium complex including an alkyl aluminum-magnesium complex and an alkyl alkoxy aluminum-magnesium complex, or an organoaluminum including an alkyl aluminum and an alkyl aluminum chloride.

Copolymer (B)

This copolymer comprises (meth)acrylic ester constituent in an amount of 2 to 30% by weight, preferably 2 to 18% by weight. When the content of (meth)acrylic ester is less than the above range, the resin composition of the present invention is like to have poor electrical properties, and when it exceeds the above range, processability in film-forming will be deteriorated.

This copolymer generally has an MFR of 0.1 to 50 g/10 min., and, from the standpoint of processability in molding into films and the like, it preferably has an MFR of 0.5 to 30 g/10 min., especially 0.8 to 15 g/10 min. The above MFR range is to be determined for the same reasons as set forth above regarding copolymer (A).

This copolymer may be prepared according to any suitable method, for example, by subjecting a monomer mixture of ethylene and a (meth)acrylic ester to polymerization under the conditions of a temperature of 150° to 300° C. and a pressure of 50 to 3000 atm. with the concomitant addition of a free-radical polymerization initiator such as a peroxide. Polymerization may be carried out using an inert solvent, or by means of bulk polymerization.

Component (2)

The specific polymeric charge-transfer type complex to be used as the antistatic material in the present invention is the reaction product of one or more of semi-polar organic boron polymeric compounds of the above formula (II) and one or more of hydroxyl-containing tertiary amines (the reaction product being produced through reaction at a ratio of one boron atom to one basic nitrogen atom).

The boron compound of the formula (II) can be prepared according to, for example, method (a) or (b) as described below.

Method (a): A triesterification reaction is carried out by reacting one mole of boric acid or a boric acid triester of a lower alcohol having 4 or less carbon atoms or 0.5 mole of boric anhydride, with a compound represented by the formula III:

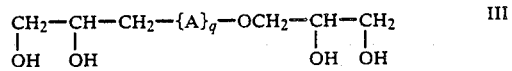

wherein q is 0 or 1, and when q=1, A represents -(X)a-(Y)b-(Z)c- group [X and Z each represent an oxygen-containing hydrocarbon residue with a total of 100 carbon atoms or less having one terminal ether residue, and Y represents

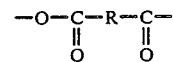

group (R is a hydrocarbon group having 1 to 82, preferably 6 to 82 carbon atoms) or

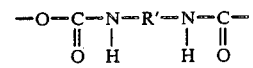

group (R' is a hydrocarbon group having 2 to 13, preferably 6 to 13 carbon atoms), a, b and c are each 0 or 1].

Method (b): A polyetherification reaction is carried out for di(glycerine)=borate or one or more of diols having a total of 206 carbon atoms or less, preferably 10 to 100, containing di(glycerine)=borate residue in the interior; or alternatively, one or more of them are reacted at a molar ratio of 1:1 with one or more of dicarboxylic acids having 3 to 84, preferably 8 to 84 carbon atoms (hereinafter called specific dicarboxylic acids), or with esters of lower alcohols having 4 or less carbon atoms with the specific dicarboxylic acids, or with halides of the specific dicarboxylic acids, or with diisocyanates having 4 to 15, preferably 8 to 15 carbon atoms (hereinafter called specific diisocyanates).

One or more of the semi-polar organic boron polymeric compounds thus prepared (hereinafter called specific semi-polar organic boron polymeric compounds) and one or more of tertiary amines with total carbon atoms of 5 to 82, preferably 5 to 30, having at least one hydroxyl group (hereinafter called specific tertiary amines) are charged into a closed or open type reactor at a charging ratio of one boron atom to one basic nitrogen atom, and reaction is carried out under atmospheric pressure at 20° to 200° C., preferably 50° to 150° C., whereby the antistatic agent of the present invention (hereinafter called the specific polymeric charge-transfer type complex) is prepared. During the reaction, if a polar solvent such as alcohol, ether, ketone, etc. is permitted to co-exist, the reaction can proceed more easily The starting materials for deriving the specific polymeric charge-transfer type complex and the specific semi-polar organic boron polymeric compound as an intermediate are as described below.

First, examples of the compounds represented by the formula III, which are the starting materials in method (a) for deriving the specific semi-polar organic boron polymeric compound, may include diglycerine, di(glycerine)=malonate, di(glycerine)=maleate, di(glycerine)=adipate, di(glycerine)=terephthalate, di(glycerine)=dodecanate, poly(9 mole)oxyethylene=-di(glycerol-ether), di(glycerine)=tolylenedicarbamate, di(glycerine)=methylenebis(4-phenylcarbamate), etc.

Examples of the specific dicarboxylic acids used in method (b) may include malonic acid, maleic acid, succinic acid, adipic acid, sebacic acid, phthalic acid, terephthalic acid, dodecanic diacid, a dimer acid derived from linoleic acid, dodecylmaleic acid, dodecenylmaleic acid, octadecylmaleic acid, octadecenylmaleic acid, maleic acid having a polybutenyl group of an average polymerization degree of 20 coupled thereto, etc. Examples of the specific diisocyanates may include ethylene diisocyanate, hexamethylene diisocyanate, tolylene diisocyanate and methylene-bis(4-phenyl isocyanate) and the like.

Next, examples of the specific tertiary amines to be reacted with the specific semi-polar organic boron polymeric compound may include diethyl=hydroxymethylamine, dimethyl=2-hydroxypropylamine, methyl=di(2-hydroxyethyl)amine, tri(2-hydroxyethyl)amine, hydroxymethyl=di(2-hydroxyethyl)amine, dibenzyl=2-hydroxypropylamine, cyclohexyl=di(2-hydroxyethyl)amine, ethylene oxide (1 to 25 moles) adducts of di(hexadecyl)amine, and propylene oxide (1 to 26 moles) adducts of monobutylamine.

The use of amine starting materials other than tertiary amines for the reaction with the specific semi-polar organic boron polymeric compound, namely primary or secondary amines, cannot successfully prepare the charge-transfer type complex, and also, the prepared complex is likely to be unstable and involves difficulties in the exhibition and maintenance of electrical conductivity, and therefore cannot give a permanent antistatic property to the ethylene random copolymer according to the invention.

Also, when a tertiary amine having no hydroxyl group is used, linking between the formed polymeric charge-transfer type complex molecules with multiple hydrogen bond is impossible, and therefore mobility of the individual chains is increased to cause changes to occur in the gathered state of the complex in the substrate material to produce the undesirable effect of insufficient charge leakage.

Composition of the invention

The amount of the specific charge-transfer type complex of the present invention to be blended with the ethylene random copolymer may differ depending on the purpose, but may generally be 0.01 to 10 parts by weight, preferably 0.05 to 5 parts by weight, particularly preferably 0.1 to 3 parts by weight, based on 100 parts by weight of the copolymer. If it is too small, the high-performance antistatic effect which is the object of the present invention cannot be obtained. On the other hand, if it is too large, undesirable problems such as coloration and bleeding will occur.

If desired, the resin composition of the present invention can be formulated with inorganic fillers, organic fillers, polymeric materials including polyolefin resin different from the ethylene random copolymer of the present invention, elastomers, etc. within the range which does not impair the effect of the present invention, to improve processability, rigidity, flexibility, etc. The above polymeric materials should be preferably used in amounts up to 50% by weight of the composition of the present invention.

As a matter of course, formulating agents other than the above components, for example, processing aids such as stabilizers, anti-oxidants, lubricants, anti-blocking agents, etc., flame retardants, various pigments, dyes, UV-absorbers, etc. can also be used, according to necessity.

The resin composition of the present invention may be prepared according to any compounding method known in the prior art.

For example, open rolls, intensive mixers, co-kneaders, single-screw or twin-screw extruders may be employed as a kneading method.

As a specific example, the specific polymeric charge-transfer type complex and the optional additive components are added to the ethylene random copolymer of the present invention in the form of powder or pellets, mixed by a Henschel mixer or the like, and then melt-kneaded through a single-screw or twin-screw extruder to form a composition in the form of pellets. The additional components may be added in the course of kneading or, alternatively, added according to the master-batch method.

The obtained pellets are subjected to various molding processes such as injection molding, extrusion molding, hollow molding, air-pressure forming, film forming, hot pressing molding, spinning, etc., and, according to necessity, are further subjected to secondary processings to give a molded product.

In the case of extrusion molding, hollow molding, etc. into films and sheets, multi-layer formation with other resins is also possible, and, in that case, the resin composition of the present invention can be used to one surface layer or both surface layers depending on purposes.

Furthermore, the resin composition of the present invention can also be used in forming its layer on the surface of a molded product comprising a resin containing a metal, a metal oxide or a carbon type electrically-conductive filler.

These molded products can be utilized in many fields where an antistatic effect or the elimination of static charges is desired. For example, for antistatic purposes, they can be applied to packaging materials for conveying and storing IC (carrier, tray, bag, rack, container, etc.), parts box for electronic parts, cases for magnetic tapes and audio tapes, slip sheets, packing materials for dangerous materials such as explosives. For static charge elimination, they can be applied to destaticizing rolls and sheets, etc. Moreover, as semiconducting materials, they can be applied to information recording papers, various resistors, etc.

Molded products obtained by permitting electrically-conductive fillers such as powdery or fibrous silver, copper, brass, iron, etc., or carbon black, tin-coated titanium oxide, tin-coated silica, etc. to be co-present with the resin composition of the present invention become electromagnetic wave shielding materials with higher precision.

Moreover, since the resin composition of the present invention possesses a good moisture resistance when it is formed into films, it is suited for use in housing materials for agriculture and packaging materials for frozen food.

EXAMPLES

The present invention is described in more detail by referring to the following examples. In the examples, "parts" means parts by weight and "%" means % by weight.

The specific polymeric charge-transfer type complexes used in the examples are those having the structural formulae shown below in Table 1.

Examples of the specific preparation methods for the complexes in Table 1 are as follows.

Specific polymeric charge-transfer type complex: A four-necked flask equipped with a stirring rod, a thermometer, an $N_2$ gas-introducing pipe and a water-testing pipe is charged with one mole of di(glycerin)borate and one mole of adipic acid, and reaction of the mixture is carried out at 220–230° C. for 4 hours under a current of $N_2$ gas to effect dehydration of 2 moles of water. After confirming a rise in melt viscosity, the reaction system is cooled to 70° C. Thereafter, methyl ethyl ketone in almost the same amount with the reaction product is charged into the flask to make a uniform solution, and then one mole of poly(25 mol)oxyethylene-dihexadecyl amine is added, and reaction is carried out at 70–75° C. for one hour. Then, methyl ethyl ketone as a diluting solvent is distilled off out of the system under a reduced pressure of 150 mmHg at 120–130° C. for 2 hours to obtain the object product.

Specific polymeric charge-transfer type complex (5): One mole of poly(9 mol)oxyethylene-di(glycerin ether) and one mole of boric acid is charged into the same flask as used above, and reaction of the mixture is carried out at 150–230° C. for 4 hours under a current of $N_2$ gas to effect dehydration of 3 moles of water. After confirming a rise in melt viscosity, the reaction system is cooled to 70° C. Thereafter, isopropyl alcohol in almost the same amount with the reaction product is charged into the flask to make a uniform solution, and then one mole of behenyl-di(2-hydroxyphenethyl) amine is added, and reaction is carried out at 70–80° C. for one hour. Then, isopropyl alcohol as a diluting solvent is distilled off out of the system under atmospheric pressure at 150–160° C. for 3 hours to obtain the object product.

The other specific polymeric charge-transfer type complexes may be prepared according to similar methods to the above described methods.

EXAMPLE 1

To 100 parts of an ethylene-butene-1 random copolymer (butene-1 content=8%, density=0.920 g/cm$^3$, melt flow rate=2.0 g/10 min.) was added the specific polymeric charge-transfer type complex of the present invention in an amount as shown in Table 2, and the mixture was melt-kneaded through a single screw extruder at 190° C. to obtain pellets. By the use of the pellets, sheet molding was conducted at 200° C. to obtain a sheet with a thickness of 150 um. Then, the sheet was left standing under constant temperature and humidity conditions of 23° C. and 50% RH for 3 days, and 30 days, and the surface resistance and the charge attenuation rate (calculated based on the amount of charges produced by forced charging by application of a voltage of 10 KV on the sample surface and the amount of the residual charges 2 minutes after stopping of the voltage application) were measured on the sheet. As comparative tests, the above procedure was repeated except for using N,N-di(2-hydroxyethyl)stearylamine, which is a known antistatic agent, in place of the specific polymeric charge-transfer type complex.

The test results are shown in Table 2, from which it can be seen that the ethylene random copolymer sheets having the specific polymeric charge-transfer type complexes dispersed homogeneously therein have no charge remaining therein, and that the performance does not deteriorate with time.

EXAMPLE 2

To 100 parts of an ethylene-octene-1 random copolymer (octene-1 content=6%, density=0.925 g/cm$^3$, melt flow rate=4.0 g/10 min.) were added the specific polymeric charge-transfer type complex of the present invention, an antiblocking agent and a slipping agent in appropriate amounts, respectively, and the mixture was melt-kneaded through a single screw extruder at 200° C. to obtain pellets. By the use of the pellets, film molding was conducted using a T-die extruder at 220° C. to obtain a film with a thickness of 50 um. The electrical characteristics of the film thus obtained were measured in the same manner as in Example 1.

As comparative tests, the above procedure was repeated except for using a low density homopolyethylene (density=0.920 g/cm$^3$, melt flow rate=4.0 g/10 min.; and density=0.925 g/cm$^3$, melt flow rate 4.0 g/10 min.) produced by the high-pressure polymerization method in place of the above ethylene random copolymer.

The test results are shown in Table 3. It is apparent from Table 3 that the films made of the compositions of the present invention have superior electrical characteristics to those of the films made of the low density polyethylene according to the comparative test in spite of their identical density and melt flow rate.

EXAMPLE 3

The procedure of Example 2 was repeated except for using an ethylene-butene-1 random copolymer (butene-1 content=8%, density=0.930 g/cm$^3$, melt flow rate=1.5 g/10 min.). As comparative tests, the same procedure was repeated except for using a high density polyethylene (density=0.950 g/cm$^3$, melt flow rate=1.0 g/10 min.).

The test results are shown in Table 4. It is apparent from Table 4 that the films made of the compositions of the present invention have no charge remaining therein and exhibit good stability in electrical properties against the lapse of time, while the films according to the comparative tests exhibit an insufficient effect of charge attenuation.

EXAMPLE 4

Using the composition in Example 1 and the ethylene-butene-1 random copolymer used in Example 1 as a base resin, die lamination molding was carried out by means of a multi-layer sheet molding machine at 200° C. to prepare a sheet with a triple layer constitution of the composition of the present invention/the ethylene-butene-1 random copolymer/the composition of the present invention (thicknesses of the respective layers: 100/250/100 um). The electrical characteristics of the multi-layer sheet were measured according to the same method as in Example 1.

As a comparative test, the above procedure was repeated except for using N,N-di(2-hydroxyethyl)-stearylamine which is a known antistatic agent.

The test results are shown in Table 5. It is apparent from Table 5 that the multi-layer sheet whose surface layers are formed of the resin composition according to the present invention hardly suffers from lowering in the electrical performance unlike the multi-layer sheet according to the comparative test.

EXAMPLE 5

To 100 parts of an ethylene-methyl acrylate copolymer (methyl acrylate content=18 wt. %, MFR=6.5 g/10 min.) was added the specific polymeric charge-transfer type complex of the present invention in an amount as shown in Table 6, and the mixture was melt-kneaded through a single screw extruder at 180° C. to obtain pellets. By the use of the pellets, sheet molding was conducted at 160° C. to obtain a sheet with a thickness of 150 um. Using this sheet sample, measurement of surface resistance and charge attenuation rate was conducted in the same manner as in Example 1.

As comparative tests, the above procedure was repeated except for using N,N-di(2-hydroxyethyl)-stearylamine.

The test results are shown in Table 6, from which it can be seen that the ethylene random copolymer sheets having the specific polymeric charge-transfer type complexes dispersed homogeneously therein have no charge remaining therein, and that the performance does not deteriorate with time.

EXAMPLE 6

To 100 parts of an ethylene-ethyl acrylate (ethyl acrylate content=8 wt. %, MFR=13 g/10 min.) were added the specific polymeric charge-transfer type complex of the present invention, an antiblocking agent and a slipping agent in appropriate amounts, respectively, and the mixture was melt-kneaded through a single screw extruder at 180° C. to obtain pellets. By the use of the pellets, film molding was conducted using a T-die extruder at 190° C. to obtain a film with a thickness of 80 um. The electrical characteristics of the film thus obtained were measured in the same manner as in Example 1.

As comparative tests, the above procedure was repeated except for using a low density homopolyethylene (density=0.925 g/cm$^3$, MFR=2.8 g/10 min.) produced by the high-pressure polymerization method, an ethylene-acrylic acid copolymer (acrylic acid content 7 wt. %, MFR=5 g/10 min.), an ethylene-methacrylic acid copolymer (methacrylic acid content=12 wt. %, MFR 8 g/10 min.) and a maleic anhydride-modified low density polyethylene (maleic anhydride content=0.7 wt. %, MFR=2 g/10 min.), respectively.

The results are shown in Table 7. It is apparent from Table 7 that the films made of the compositions of the present invention exhibit excellent electrical characteristics with no charge remaining therein, while the films according to the comparative tests exhibit an insufficient effect of charge attenuation.

EXAMPLE 7

Using the composition in Example 6 and a polyethylene (density=0.920 g/cm$^3$, MFR=2 g/10 min.), die lamination molding was carried out by means of a multi-layer sheet molding machine at 200° C. to prepare a sheet with a triple layer constitution of the composition of the present invention/the polyethylene/the composition of the present invention (thickness of the respective layers: 25/50/25 um). The electrical characteristics of the multi-layer sheet were measured according to the same method as in Example 1.

As a comparative test, the above procedure was repeated except for using N,N-di(2-hydroxyethyl)-stearylamine.

The test results are shown in Table 8. It is apparent from Table 8 that the electrical characteristics of the multi-layer sheet whose surface layers are formed of the ethylene random copolymer having the specific charge-transfer type complex homogeneously dispersed therein do not deteriorate with time.

EXAMPLE 8

Using the composition in Example 5, extrusion coating was carried out onto one side of a kraft paper (thickness: 100 um) at 250° C. to form a coating of a thickness of 20 um. The electrical characteristics of the coated paper thus obtained were measured according to the same method as in Example 1. The test results are shown in Table 9.

EXAMPLE 9

To 100 parts of an ethylene-ethyl methacrylate copolymer (ethyl methacrylate content=11 wt. %, MFR=8 g/10 min.), the specific polymeric charge-transfer type complex of the present invention was added in a given amount, and the mixture was melt-kneaded through a single screw extruder at 180° C. to obtain pellets. A sheet sample was prepared from these pellets in the same manner as in Example 5. On the sheet sample thus prepared, measurement of electrical characteristics was carried out in the same manner as in Example 1.

The test results are shown in Table 10, from which it can be seen that the ethylene random copolymer sheets having the specific polymeric charge-transfer type complexes dispersed homogeneously therein have no charge remaining therein, and that the performance does not deteriorate with time.

TABLE 1

Specific polymeric charge-transfer type complex

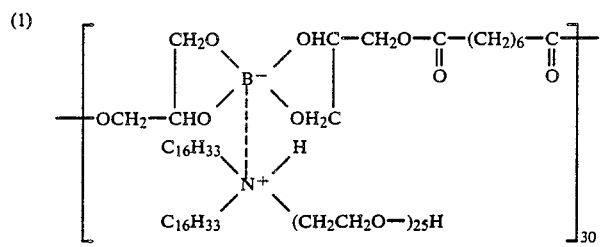

TABLE 1-continued
Specific polymeric charge-transfer type complex
(2) 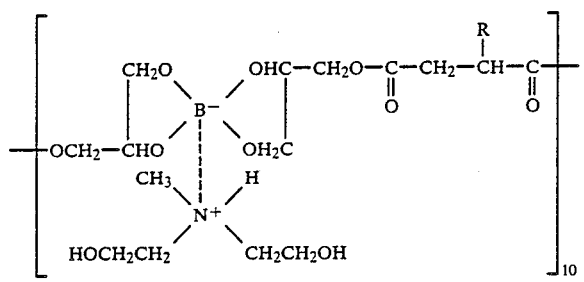
R is a residue of polybutene having an average degree of polymerization of 20
(3) 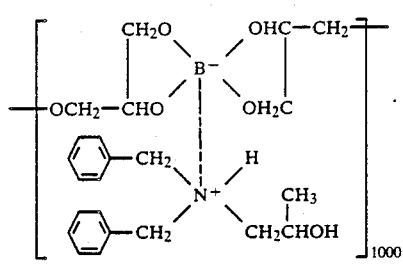
(4) 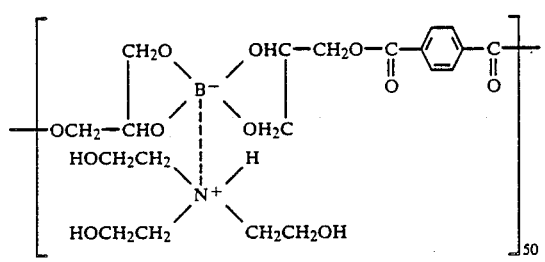
(5) 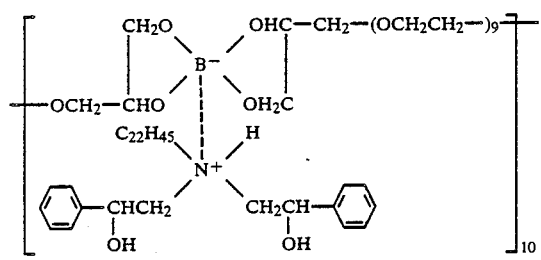
(6) 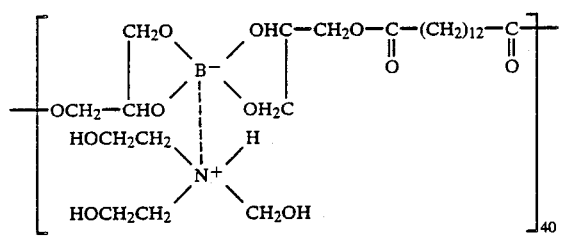

TABLE 1-continued
Specific polymeric charge-transfer type complex
(7) 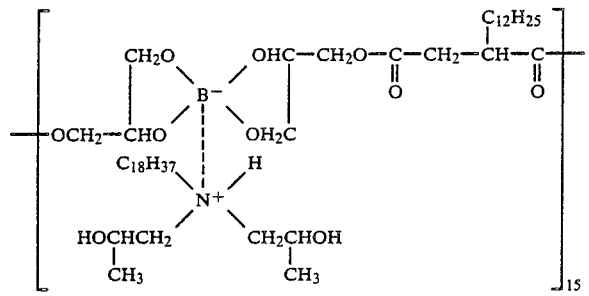
(8) 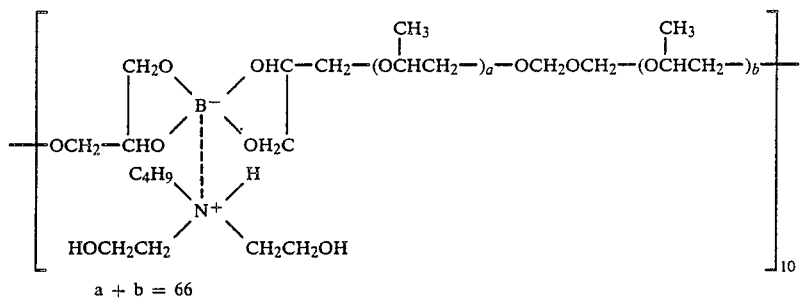
(9) 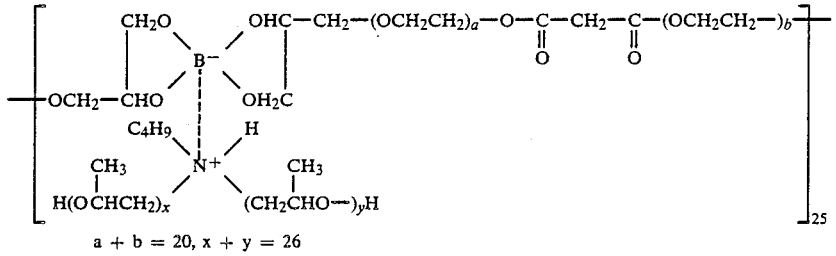
(10) 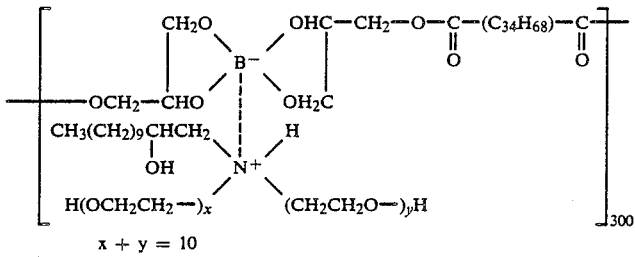
(11) 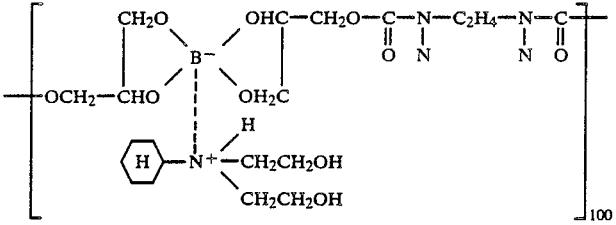

TABLE 1-continued

Specific polymeric charge-transfer type complex

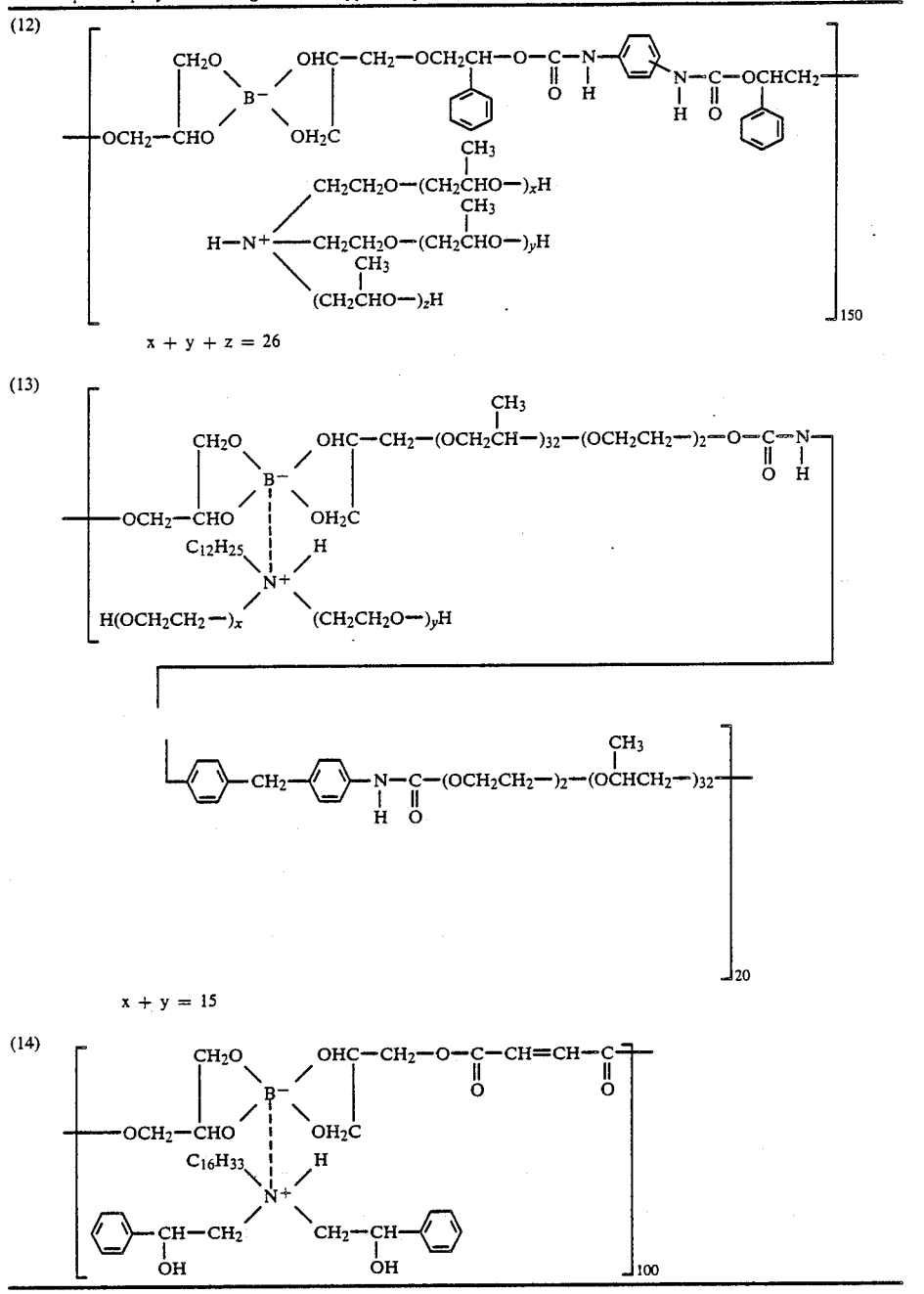

TABLE 2

(Example 1)

| Run No. | Specific polymeric charge-transfer type complex (Parts by weight based on 100 parts by weight of propylene copolymer) | | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|---|
| 1 | Not added | | | $2 \times 10^{16}$ | 4 | $2 \times 10^{16}$ | 4 |
| 2 | Specific polymeric charge-transfer type complex (1) | | (1.0 part) | $3 \times 10^{10}$ | 100 | $3 \times 10^{10}$ | 100 |
| 3 | " | | (0.8 part) | $7 \times 10^{10}$ | 100 | $7 \times 10^{10}$ | 100 |
| 4 | Specific polymeric charge-transfer type complex (2) | | (1.5 parts) | $2 \times 10^{10}$ | 100 | $2 \times 10^{10}$ | 100 |
| 5 | Specific polymeric charge-transfer type complex (3) + Specific polymeric charge-transfer type complex (4) | 10% 90% | (1.0 part) | $4 \times 10^{10}$ | 100 | $4 \times 10^{10}$ | 100 |
| 6 | Specific polymeric charge-transfer type complex (5) | | (0.5 part) | $8 \times 10^{10}$ | 100 | $8 \times 10^{10}$ | 100 |

TABLE 2-continued
(Example 1)

| Run No. | Specific polymeric charge-transfer type complex (Parts by weight based on 100 parts by weight of propylene copolymer) | | | Day 3 Surface resistance (Ω) | Day 3 Charge attenuation rate (%) | Day 30 Surface resistance (Ω) | Day 30 Charge attenuation rate (%) |
|---|---|---|---|---|---|---|---|
| 7 | Specific polymeric charge-transfer type complex (6) + Specific polymeric charge-transfer type complex (7) | 50% 50% | (1.0 part) | $8 \times 10^{10}$ | 100 | $8 \times 10^{10}$ | 100 |
| 8 | Specific polymeric charge-transfer type complex (8) + Specific polymeric charge-transfer type complex (9) | 80% 20% | (1.0 part) | $6 \times 10^{10}$ | 100 | $6 \times 10^{10}$ | 100 |
| 9 | Specific polymeric charge-transfer type complex (10) | | (0.8 part) | $1 \times 10^{10}$ | 100 | $1 \times 10^{10}$ | 100 |
| 10 | Specific polymeric charge-transfer type complex (11) + Specific polymeric charge-transfer type complex (12) | 10% 90% | (1.5 parts) | $6 \times 10^{10}$ | 100 | $6 \times 10^{10}$ | 100 |
| 11 | Specific polymeric charge-transfer type complex (13) + Specific polymeric charge-transfer type complex (14) | 90% 10% | (1.5 parts) | $4 \times 10^{10}$ | 100 | $4 \times 10^{10}$ | 100 |
| Comp. 12 | N,N-di(2-hydroxyethyl)stearylamine | | (1.2 parts) | $3 \times 10^{11}$ | 90 | $1 \times 10^{13}$ | 38 |

TABLE 3
(Example 2)

| Run No. | Specific polymeric charge-transfer type complex (Parts by weight based on 100 parts by weight of propylene copolymer) | | | Day 3 Surface resistance (Ω) | Day 3 Charge attenuation rate (%) | Day 30 Surface resistance (Ω) | Day 30 Charge attenuation rate (%) |
|---|---|---|---|---|---|---|---|
| 13 | Specific polymeric charge-transfer type complex (1) | | (1.0 part) | $2 \times 10^{10}$ | 100 | $2 \times 10^{10}$ | 100 |
| 14 | " | | (0.8 part) | $5 \times 10^{10}$ | 100 | $5 \times 10^{10}$ | 100 |
| 15 | Specific polymeric charge-transfer type complex (6) + Specific polymeric charge-transfer type complex (7) | 50% 50% | (0.8 part) | $7 \times 10^{10}$ | 100 | $7 \times 10^{10}$ | 100 |
| 16 | Specific polymeric charge-transfer type complex (10) | | (0.8 part) | $1 \times 10^{10}$ | 100 | $1 \times 10^{10}$ | 100 |
| Comp. 17 | Low density homopolyethylene (density = 0.920) Specific polymeric charge-transfer type complex (1) | | (0.8 part) | $1 \times 10^{12}$ | 88 | $1 \times 10^{12}$ | 88 |
| 18 | Low density homopolyethylene (density = 0.925) Specific polymeric charge-transfer type complex (1) | | (0.8 part) | $4 \times 10^{11}$ | 91 | $4 \times 10^{11}$ | 91 |

TABLE 4
(Example 3)

| Run No. | Specific polymeric charge-transfer type complex (Parts by weight based on 100 parts by weight of propylene copolymer) | | Day 3 Surface resistance (Ω) | Day 3 Charge attenuation rate (%) | Day 30 Surface resistance (Ω) | Day 30 Charge attenuation rate (%) |
|---|---|---|---|---|---|---|
| 19 | Specific polymeric charge-transfer type complex (1) | (0.8 part) | $9 \times 10^{10}$ | 100 | $9 \times 10^{10}$ | 100 |
| 20 | Specific polymeric charge-transfer type complex (5) | (0.5 part) | $1 \times 10^{11}$ | 100 | $1 \times 10^{11}$ | 100 |
| Comp. 21 | High density polyethylene (density = 0.950) Specific polymeric charge-transfer type complex (1) | (0.8 part) | $5 \times 10^{15}$ | 12 | $5 \times 10^{15}$ | 12 |
| 22 | High desnity polyethylene (density = 0.950) Specific polymeric charge-transfer type complex (5) | (0.5 part) | $7 \times 10^{15}$ | 11 | $7 \times 10^{15}$ | 11 |

TABLE 5
(Example 4)

| Run No. | Specific polymeric charge-transfer type complex (Parts by weight based on 100 parts by weight of propylene copolymer) | | Day 3 Surface resistance (Ω) | Day 3 Charge attenuation rate (%) | Day 30 Surface resistance (Ω) | Day 30 Charge attenuation rate (%) |
|---|---|---|---|---|---|---|
| 23 | Specific polymeric charge-transfer type complex (1) | (1.0 part) | $5 \times 10^{10}$ | 100 | $5 \times 10^{10}$ | 100 |
| Comp. 24 | N,N-di(2-hydroxyethyl)stearylamine | (1.0 part) | $4 \times 10^{11}$ | 90 | $8 \times 10^{13}$ | 41 |

TABLE 6

(Example 5)

| Run No. | Specific polymeric charge-transfer type complex (Parts by weight based on 100 parts by weight of propylene copolymer) | | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|---|
| 25 | Not added | | | $3 \times 10^{15}$ | 4 | $3 \times 10^{15}$ | 4 |
| 26 | Specific polymeric charge-transfer type complex (1) | | (1.0 part) | $9 \times 10^{9}$ | 100 | $9 \times 10^{9}$ | 100 |
| 27 | " | | (0.5 part) | $2 \times 10^{10}$ | 100 | $2 \times 10^{10}$ | 100 |
| 28 | " | | (0.3 part) | $6 \times 10^{10}$ | 100 | $6 \times 10^{10}$ | 100 |
| 29 | Specific polymeric charge-transfer type complex (2) | | (1.0 part) | $2 \times 10^{10}$ | 100 | $2 \times 10^{10}$ | 100 |
| 30 | Specific polymeric charge-transfer type complex (5) | | (0.8 part) | $9 \times 10^{9}$ | 100 | $9 \times 10^{9}$ | 100 |
| 31 | Specific polymeric charge-transfer type complex (8) + Specific polymeric charge-transfer type complex (9) | 80% 20% | (1.0 part) | $3 \times 10^{10}$ | 100 | $3 \times 10^{10}$ | 100 |
| 32 | Specific polymeric charge-transfer type complex (13) + Specific polymeric charge-transfer type complex (14) | 95% 5% | (1.0 part) | $5 \times 10^{10}$ | 100 | $5 \times 10^{10}$ | 100 |
| Comp. 33 | N,N-di(2-hydroxyethyl)stearylamine | | (1.0 part) | $1 \times 10^{11}$ | 94 | $5 \times 10^{12}$ | 70 |

TABLE 7

(Example 6)

| Run No. | Specific polymeric charge-transfer type complex (Parts by weight based on 100 parts by weight of propylene copolymer) | | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|---|
| 34 | Not added | | | $4 \times 10^{15}$ | 4 | $4 \times 10^{15}$ | 4 |
| 35 | Specific polymeric charge-transfer type complex (1) | | (0.8 part) | $2 \times 10^{10}$ | 100 | $2 \times 10^{10}$ | 100 |
| 36 | Specific polymeric charge-transfer type complex (3) + Specific polymeric charge-transfer type complex (4) | 10% 90% | (1.5 parts) | $9 \times 10^{9}$ | 100 | $9 \times 10^{9}$ | 100 |
| 37 | Specific polymeric charge-transfer type complex (6) | | (1.5 parts) | $1 \times 10^{10}$ | 100 | $1 \times 10^{10}$ | 100 |
| 38 | Specific polymeric charge-transfer type complex (7) | | (1.5 parts) | $1 \times 10^{10}$ | 100 | $1 \times 10^{10}$ | 100 |
| 39 | Specific polymeric charge-transfer type complex (11) + Specific polymeric charge-transfer type complex (12) | 10% 90% | (1.0 part) | $6 \times 10^{10}$ | 100 | $6 \times 10^{10}$ | 100 |
| Comp. 40 | Low density homopolyethylene Specific polymeric charge-transfer type complex (1) | | (0.8 part) | $4 \times 10^{11}$ | 91 | $4 \times 10^{11}$ | 91 |
| 41 | Ethylene-acrylic acid copolymer Specific polymeric charge-transfer type complex (1) | | (1.0 part) | $4 \times 10^{14}$ | 8 | $4 \times 10^{14}$ | 8 |
| 42 | Ethylene-methacrylic acid copolymer Specific polymeric charge-transfer type complex (1) | | (1.0 part) | $9 \times 10^{13}$ | 15 | $9 \times 10^{13}$ | 15 |
| 43 | Maleic anhydride-modified low density polyethylene Specific polymeric charge-transfer type complex (1) | | (1.0 part) | $4 \times 10^{14}$ | 4 | $4 \times 10^{14}$ | 4 |

TABLE 8

(Example 7)

| Run No. | Specific polymeric charge-transfer type complex (Parts by weight based on 100 parts by weight of propylene copolymer) | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|
| 44 | Specific polymeric charge-transfer type complex (1) | (0.8 part) | $1 \times 10^{10}$ | 100 | $1 \times 10^{10}$ | 100 |
| 45 | N,N-di(2-hydroxyethyl)stearylamine | (1.0 part) | $2 \times 10^{11}$ | 94 | $9 \times 10^{13}$ | 38 |

TABLE 9

(Example 8)

| Run No. | Specific polymeric charge-transfer type complex (Parts by weight based on 100 parts by weight of propylene copolymer) | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|
| 46 | Specific polymeric charge-transfer type complex (1) | (1.0 part) | $8 \times 10^{9}$ | 100 | $8 \times 10^{9}$ | 100 |

TABLE 10
(Example 9)

| Run No. | Specific polymeric charge-transfer type complex (Parts by weight based on 100 parts by weight of propylene copolymer) | | Day 3 | | Day 30 | |
|---|---|---|---|---|---|---|
| | | | Surface resistance ($\Omega$) | Charge attenuation rate (%) | Surface resistance ($\Omega$) | Charge attenuation rate (%) |
| 47 | Not added | | $4 \times 10^{15}$ | 4 | $4 \times 10^{15}$ | 4 |
| 48 | Specific polymeric charge-transfer type complex (1) | (1.0 part) | $8 \times 10^9$ | 100 | $8 \times 10^9$ | 100 |
| 49 | Specific polymeric charge-transfer type complex (5) | (1.0 part) | $7 \times 10^9$ | 100 | $7 \times 10^9$ | 100 |
| 50 | Specific polymeric charge-transfer type complex (7) | (1.0 part) | $3 \times 10^{10}$ | 100 | $3 \times 10^{10}$ | 100 |

What is claimed is:

1. An antistatic resin composition comprising the components (1) and (2) shown below:
   component (1): an ethylene random copolymer having a melt flow rate of 0.1 to 50 g/10 min. obtained by copolymerizing 99 to 70% weight of ethylene and 1 to 30% by weight of a comonomer represented by the formula I:

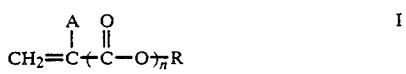

wherein n is 0 or 1, and when n=0, R represents an alkyl group having 2 to 8 carbon atoms and A represents hydrogen, and when n=1, R represents an alkyl group having 1 to 20 carbon atoms and A represents hydrogen or a methyl group;
   component (2): a polymeric charge-transfer type complex which is the reaction product of one or more of semi-polar organic boron polymeric compounds represented by the formula II shown below with one or more of tertiary amines with total carbon atoms of 5 to 82 having at least one hydroxyl group, produced through reaction at a ratio of one boron atom to one basic nitrogen atom:

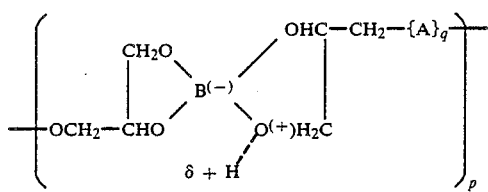

wherein q is 0 or 1, and when q=1, A represents -(X)a-(Y)b-(Z)c- group, X and Z each represent an oxygen-containing hydrocarbon residue with a total of 100 carbon atoms or less having one terminal ether residue, and Y represents

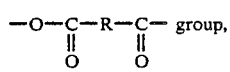

R is a hydrocarbon group having 1 to 82 carbon atoms, or

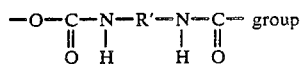

R' is a hydrocarbon group having 2 to 13 carbon atoms, a, b and c are each 0 or 1, and p is 10 to 1000.

2. The antistatic resin composition according to claim 1, wherein the comonomer represented by the formula I is an α-olefin having 4 to 8 carbon atoms.

3. The antistatic resin composition according to claim 1, wherein the comonomer represented by the formula I is a (meth)acrylic ester having an alkyl group of 4 carbon atoms or less.

4. The antistatic resin composition according to claim 3, wherein the (meth)acrylic ester is methyl acrylate of ethyl acrylate.

5. The antistatic resin composition according to claim 1, wherein the ethylene random copolymer of component (1) has a density of 0.910 and 0.940 g/cm$^3$ and comprises 99 to 75% by weight of ethylene and 1 to 25% by weight of an α-olefin having 4 to 10 carbon atoms.

6. The antistatic resin composition according to claim 1, wherein the ethylene random copolymer comprises 98 to 70% by weight of ethylene and 2 to 30% by weight of an acrylic ester and/or a methacrylic ester.

7. The antistatic resin composition according to claim 1, wherein the tertiary amines are selected from the group consisting of diethyl=hydroxymethylamine, dimethyl=2-hydroxypropylamine, methyl=di(2-hydroxyethyl)amine, tri(2-hydroxyethyl)amine, hydroxymethyl=di(2-hydroxyethyl)amine, dibenzyl=2-hydroxypropylamine, cyclohexyl=di(2-hydroxyethyl)amine, 1 to 25 moles of ethylene oxide, adducts of di(hexadecyl)amine, and 1 to 26 moles of propylene oxide adducts of monobutylamine.

8. The antistatic resin composition according to claim 1, wherein the amount of component (2) is 0.01 to 10 parts by weight based on 100 parts by weight of component (1).

9. The antistatic resin composition according to claim 8, wherein the amount of component (2) is 0.1 to 3 parts by weight.

10. The antistatic resin composition according to claim 1, further comprising an inorganic or organic filler.

11. The antistatic resin composition according to claim 1, further comprising a polyolefin resin other than the propylene random copolymer (A) or (B) of component (1) in an amount up to 50% by weight of the composition.

* * * * *